US005342072A

United States Patent [19]

Prasad

[11] Patent Number: 5,342,072

[45] Date of Patent: Aug. 30, 1994

[54] BABY WALKER HAVING SAFETY INTERLOCK

[76] Inventor: Romeo Prasad, 10 Warren La., Windsor, Conn. 06095

[21] Appl. No.: 18,064

[22] Filed: Feb. 16, 1993

[51] Int. Cl.[5] .................... B62B 7/04

[52] U.S. Cl. .................... 280/87.051; 482/68

[58] Field of Search .................... 280/87.051, 87.041, 280/87.021, 33.994; 188/31; 482/66, 67, 68, 69

[56] References Cited

U.S. PATENT DOCUMENTS

| | | | |
|---|---|---|---|
| 3,356,185 | 12/1967 | Isaacks | 280/33.994 |
| 4,084,663 | 4/1978 | Haley | 280/33.994 |
| 4,577,880 | 3/1986 | Bianco | 280/33.994 |
| 4,776,415 | 10/1988 | Brice | 280/87.051 |
| 5,046,748 | 9/1991 | Oat-Judge | 280/33.994 |

*Primary Examiner*—Richard M. Camby

*Attorney, Agent, or Firm*—Robert S. Smith

[57] ABSTRACT

A walker for an infant or incapacitated adult which includes a frame work dimensioned and configured for placement around the user having an upper member dimensioned to enable the user to support him or herself and a lower member encircling the legs of the user, the upper and lower members being disposed in spaced relationship. The apparatus also includes a plurality of wheels carried on the second member at spaced parts thereof and apparatus for locking the wheels responsive to passage of the walker into a predetermined zone of danger. In some forms of the invention the apparatus for locking includes a apparatus contacting the circumference of each of the wheels. The wheels may be caster wheels and the apparatus for locking may include a plurality of holes in the circumference of each wheel and a pin dimensioned and configured for engaging the holes. The apparatus for locking may include a cable connected to each pin for limiting axial motion thereof. The apparatus for locking may include a receiver for receiving a signal and a transmitter for sending a signal which may be for a radio frequency signal. The apparatus may also include apparatus for sensing movement of the walker into a predetermined zone of danger.

7 Claims, 3 Drawing Sheets

BABY WALKER HAVING SAFETY INTERLOCK

BACKGROUND OF THE INVENTION

The invention relates to baby walkers and the like and more particularly to devices for preventing movement of such walkers into zones of danger such as the top of a stairway. The United States government estimates that in 1991 there were 30,000 stroller accidents in the United States that required emergency room treatment of an infant. The problem is so severe that consideration has been given to a ban on the sale of such apparatus. The typical walker supports an infant sufficiently so that the infant can move on two feet about a floor. A typical scenario leading to death or serious injury includes an infant moving toward the top of a stairway and toppling down the stairway. While the invention has particular application to walkers intended for infants, it will be understood that it may also have application for walkers intended for elderly people or other suffering from physical disabilities making it difficult for that person to walk in a conventional manner. More particularly, the invention will have application, for example, for use with elderly people who may suffer both from inadequate physical strength to enable them to walk in a conventional manner as well as a handicaps resulting from Parkinson's disease or other mental disabilities.

The dangers inherent in stairs are not the only dangers that an infant or adults may be exposed to in using a walker. It may be undesirable, for example, for the person utilizing the walker to pass into a specific room, such as the kitchen, because of the presence of dangerous materials such as lye used to clean the traps in the drains from kitchens sinks as well as other poisonous or harmful materials. In other cases it may be desirable to prevent the infant or person from entering a given room because of the potential for damage some delicate electronic equipment or other work product that is disposed in a given room.

The know stroller apparatus has no constraints on the movement of the stroller.

SUMMARY AND OBJECTS OF THE INVENTION

It is an object of the present invention to provide apparatus which will lock the wheels of a walker to limit the movement of the walker upon passage of the walker into a zone of danger.

Another object of the invention is to provide control over the actuation of the locking action whereby the actuation occurs when the walker moves into a zone of danger.

It is another object of the invention to provide apparatus that will also provide an audible alarm if the walker passes into a zone of danger.

Still another object of the invention is to provide apparatus which is simple and inexpensive to manufacture.

Still another object of the invention is to provide apparatus which will be inexpensive to manufacture.

Yet another object of the invention is to provide apparatus which is easy to install on virtually any automobile.

It has been found that these and other objects of the invention may be attained in a walker for an infant or incapacitated adult which includes a frame work dimensioned and configured for placement around the user having an upper member dimensioned to enable the user to support him or herself and a lower member encircling the legs of the user, the upper and lower members being disposed in spaced relationship. The apparatus also includes a plurality of wheels carried on the second member at spaced parts thereof and means for locking the wheels responsive to passage of the walker into a predetermined zone of danger.

In some forms of the invention the means for locking includes a means contacting the circumference of each of the wheels. The wheels may be caster wheels and the means for locking may include a plurality of holes in the circumference of each wheel and a pin dimensioned and configured for engaging the holes. The means for locking may include a cable connected to each pin for limiting axial motion thereof. The means for locking may include a receiver for receiving a signal and a transmitter for sending a signal which may be for a radio frequency signal. The apparatus may also include means for sensing movement of the walker into a predetermined zone of danger.

In some embodiments of the invention the means for locking includes a solenoid disposed at each caster wheel, each solenoid including a pin for engaging one of the caster wheels.

BRIEF DESCRIPTION OF THE DRAWING

The invention will be better understood by reference to the accompanying drawing in which.

DETAILED DESCRIPTION OF THE PREFERRED EMBODIMENTS

Figure 1:
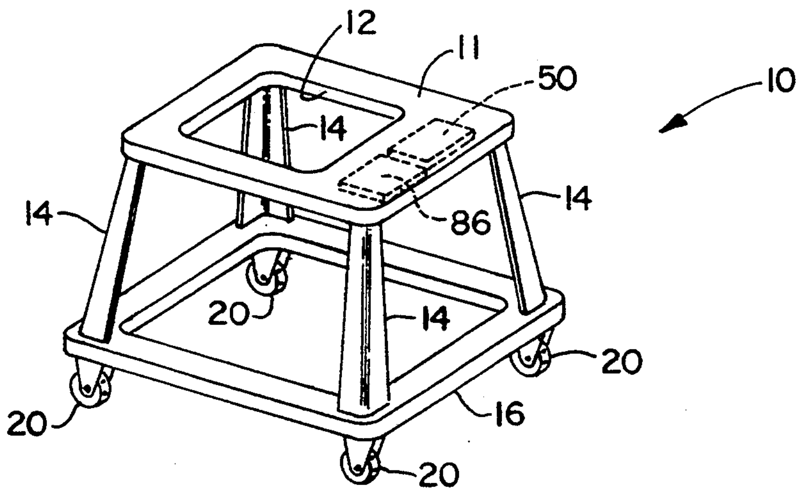
FIG. 1 is a perspective view of the walker apparatus in accordance with one form of the invention.

Referring now to FIGS. 1-6 there is shown a walker 10. This walker 10 is a generally box-like structure intended to substantially surround the body of the user. The box-like structure 10 includes generally planar generally square upper surface 11 having an opening 12 through which the torso of the user extends. The generally planar surface 11 is supported on four columns 14 disposed at each corner of the planar surface 11. Each column 14 is generally vertical although it will be seen in the preferred embodiment, each column 14 has the lower extremity thereof disposed further away from the geometric center of the structure 10 than the upper axial extremity thereof. It will be clear to those skilled in the art that it is desirable that the base of the walker be larger than the top to maximize the stability and reduce the possibility of the walker turning over when it is being used. The lower axial extremities of the columns 14 are joined together by a generally rectangular ring 16 that join respective adjacent columns 14. Carried on mounting brackets 18 are respective casters 20 at the corners of the ring 16. This structure is described to this point is conventional and is subject to the deficiencies described in the background of the invention section of this application.

In the preferred embodiment, there is provided a locking mechanism to lock the wheels of the respective casters 20 upon movement of the walker 10 into a zone of danger. The basic concept is to lock the respective wheels 20 of the respective casters 18*a* by a latching mechanism which engages the respective wheels 20 to prevent their rotation and thus prevent the user from urging the walker 10 from the position at the time of initiation of the locking movement. It will be understood that the infant who uses a typical walker 10 does not have sufficient strength in his or her legs to walk without the aid of a walker. Accordingly, such an infant cannot readily make the walker 10 move if the wheels 20 do not rotate. Therefore, if the respective wheels of the casters 20 are locked so that they will not rotate, the typical user will be unable to move the walker 10 further into the zone of danger.

In one preferred form of the invention, flexible cables 30 extend from each caster 18*a* to a common angle iron member 32. Each cable 30 includes an outer sleeve. Such cables are sometimes referred to as Bolen cables and are of the same general type as those used to shift gears in common 10 speed bicycles. The cables 30 are utilized to selectively allow pins 34 to enter into one of several recesses 36 in each wheel 20 which is part of each caster 18*a*. More specifically, each pin 34 includes a flange 34*a* that slides within a respective cup 40 that is fixed to a respective bracket 18. A coil spring 41 is disposed between the flange 34*a* and the cup 40 to bias the pin 34 toward the holes 36 in the wheel 20.

The angle iron member 32 secures the outer sleeve that is part of each cable 30. Each sleeve of each cable 30 is also fixed to one of four plates 42 fixed to the ring 16 near each of the casters 18*a*. The inner wire of each cable 30 is fixed at one end to a T-shaped head 50 and at the other end to one of the pins 34. The T-shaped head 50 is fixed to a slide 54 that is dimensioned and configured to slide readily in a track defined by opposed side walls 56, 56.

Figure 2:
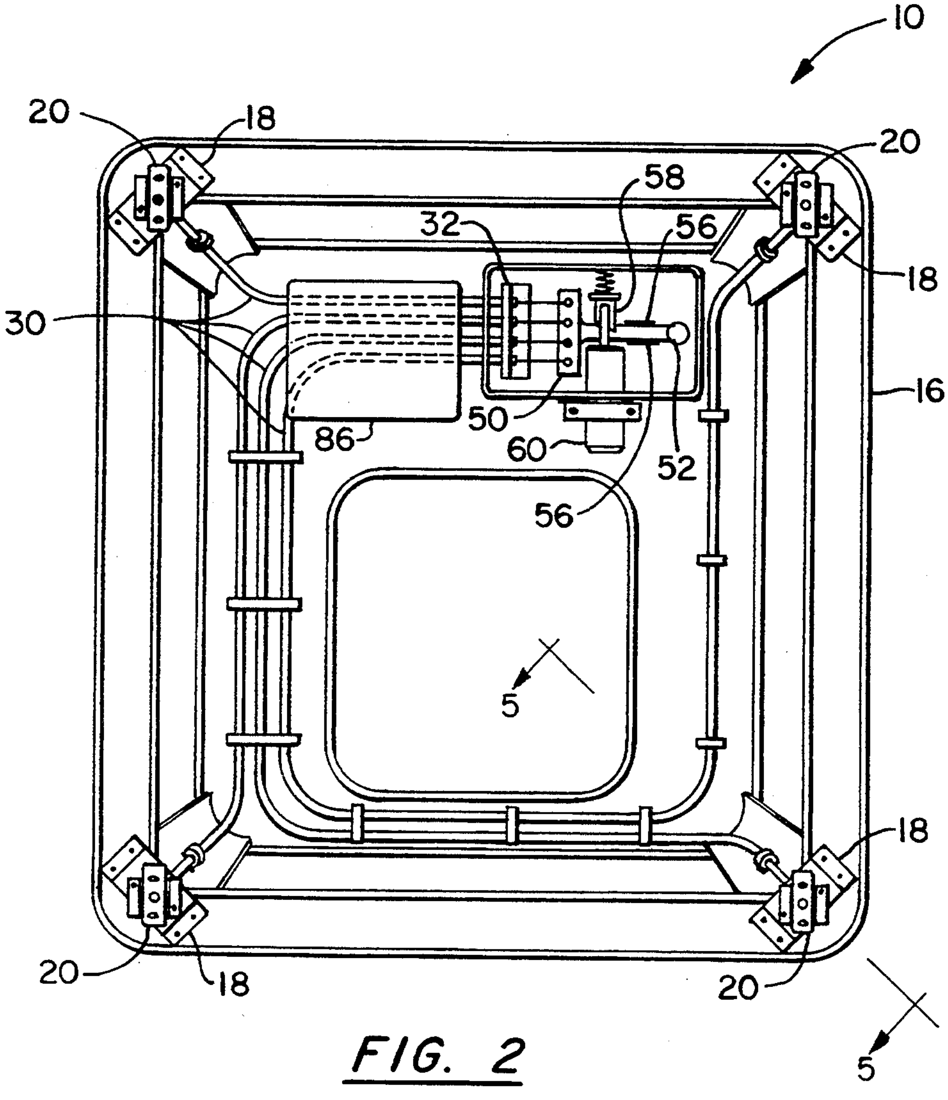
FIG. 2 is a bottom view of the apparatus shown in FIG. 1.

A spring biased latch 58 engages the slide 54 and holds the slide in a "cocked" position with the four springs 41 compressed and thus urging the inner wires of each of the cables 30 to move within the respective sleeves thereof. A solenoid 60 is provide to trip the latch 58 by moving the latch away from the slide 41 to allow the spring bias provided by the four springs 41 to urge the slide 52 to the left as shown in FIG. 2. Accordingly the T-shaped head 50 will move with the slide 52. Thus the respective pins 34 are urged into one of the holes 36 in the periphery of the wheels 20. This is shown in greater detail in FIG. 3. In the embodiment shown in FIG. 3 a diameter of the wheel 20 is disposed in aligned relationship with the pin 34. In other words the mounting bracket 18*b* and the location of the holes 62 differs from the embodiment of FIG. 6.

Figures 3, 4:
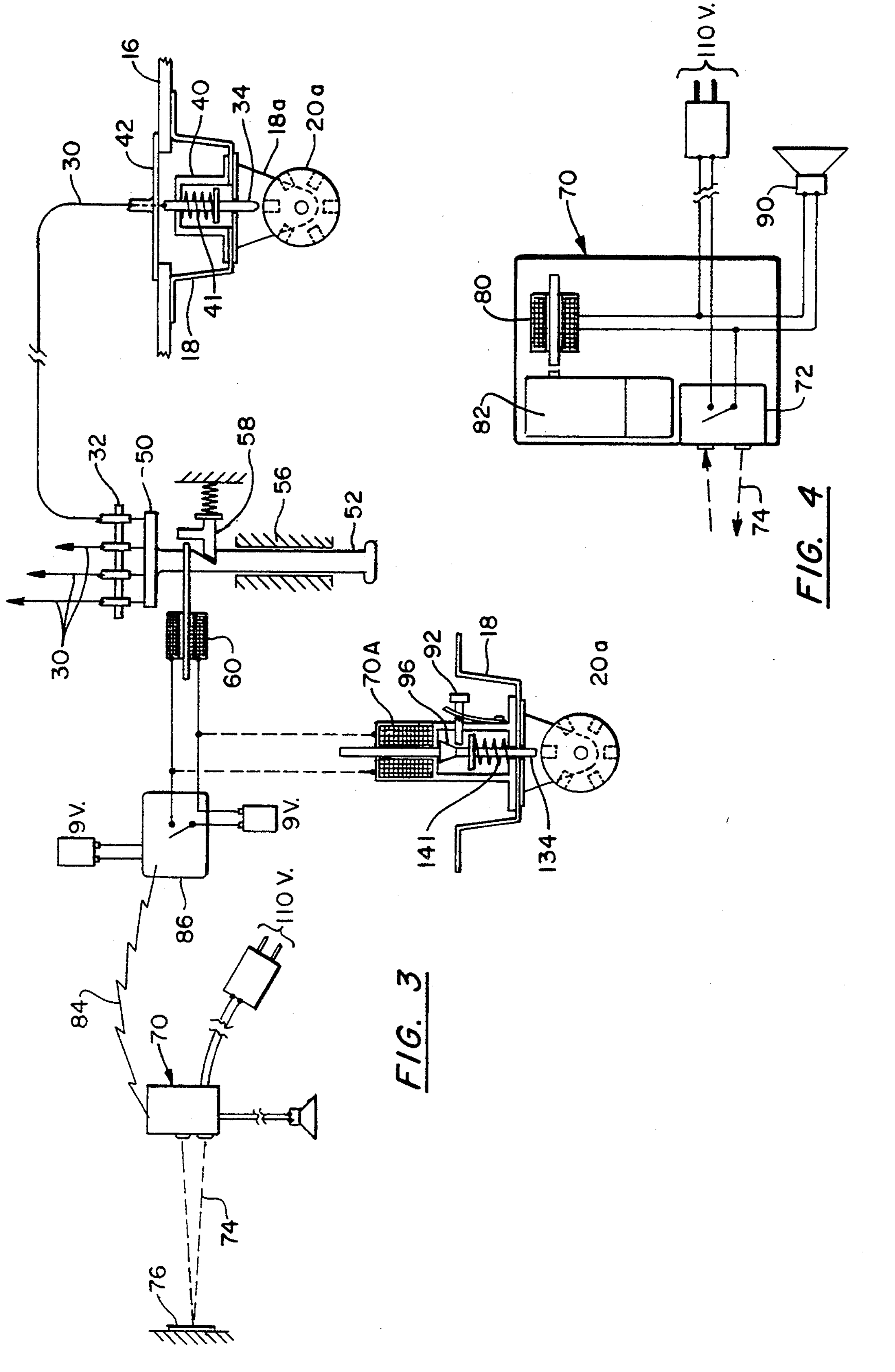
FIG. 3 is a partially schematic view of the locking mechanisms in accordance with two forms of the invention.
FIG. 4 is a partially schematic view of an audible alarm that is a part of one form of the invention.
Figure 5:
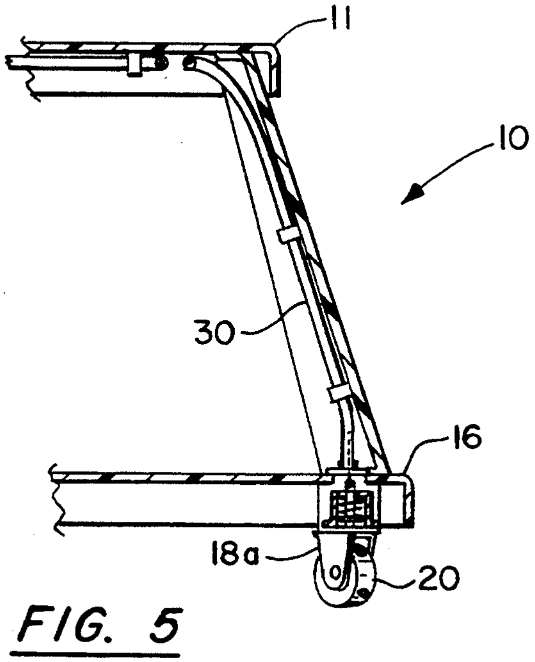
FIG. 5 is a partially schematic view illustrating in greater detail the location of a cable extending to an individual wheel for locking that wheel.

In an alternate embodiment illustrated at the bottom of FIG. 3 a solenoid 70 is disposed at each corner of the ring 16. Brief application of power to each of the respective solenoids tends to force the associated pin 134 thereof into one of the holes in the wheel 20*a*. In this embodiment the spring 141 biases the pin 134 away from the wheel 20*a*. In the event the hole in the wheel 20*a* is not properly aligned any movement initiated by infant user will ordinarily allow the pin 134 to travel into a hole in the wheel 20*a*. A spring detent may be provided to latch the pin i engagement with the wheel 20*a*. Thus, it will only be necessary to provide power to the solenoid 70 for a brief interval of time.

Figure 6:
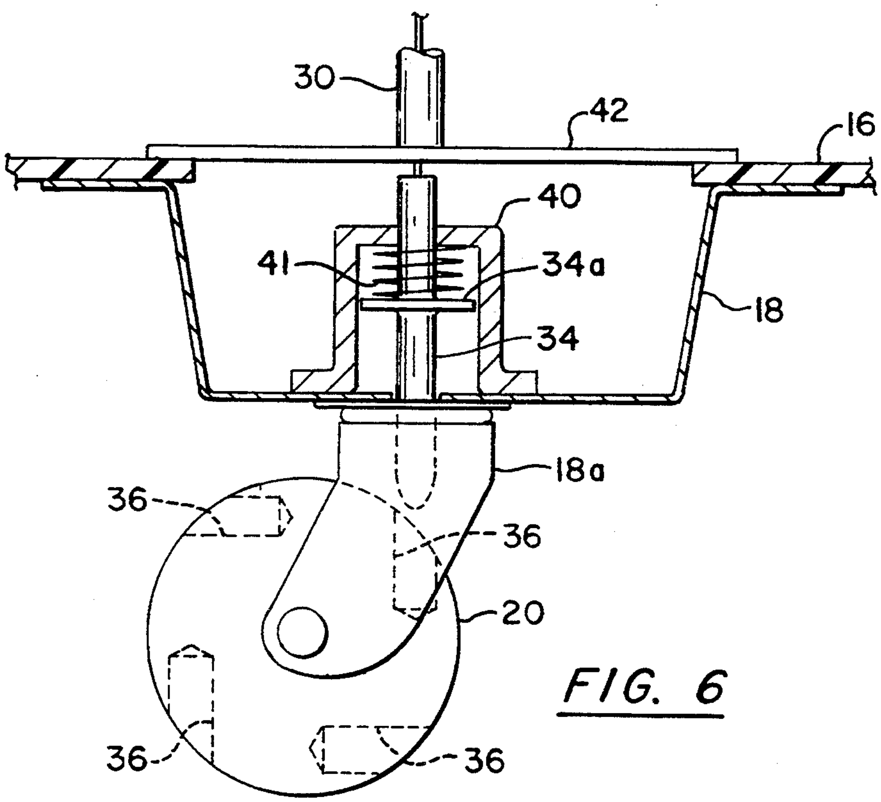
FIG. 6 is a partially sectional view of an individual caster and the locking pin used to lock that wheel of that caster.

In various embodiments of the invention the pin 34 or 134 may enter a bore in the wheel that is radial as shown in FIG. 3 or may be perpendicular to radius as shown in FIG. 6. The number of holes provided in the wheel 20 will depend on the orientation. More specifically, with the orientation as shown in FIG. 6 there is clearly a greater angular sector used up by each bore or hole than in the structure shown in FIG. 1.

Various alternative structures will be apparent to those skilled in the art. For example, the wheel 20 shown in FIG. 3 do not necessarily caster as in FIG. 6. In some embodiments for cup 40 may have the axis thereof disposed in aligned relationship with a bore in the wheel. In still other embodiments a curved tube maybe provided to direct the pin into the bore.

Ordinarily the apparatus in accordance with the invention includes means for preventing further movement of the wheels 20 and hence the walker 10 upon the occurrence of some predetermined event or the elapse of some time interval. In the preferred embodiments a transmitter 70 that includes an infrared transmitter receiver 72 that emits an infrared beam 74 that in normal operation will strike a reflector 76 and return to the transmitter receiver 72. This aspect of the structure is somewhat similar to the apparatus used to signal the arrival and departure of customers in stores.

If the beam 74 is obstructed the receiver transmitter will energize a relay 80 that will provide electrical power to a radio transmitter 82 and an audible alarm 90. The radio transmitter 82 broadcasts a signal 84 that is received by a receiver 86 disposed on the walker 10. This aspect is similar to apparatus commonly used to control garage doors.

In operation the receiver transmitter 74 and reflector are paced in space relation at the top of a stairway or across a doorway to a room that a parent may wish to preclude an infant from entering. If the infant breaks the beam 74 the relay 80 triggers the alarm 90 and activates the transmitter 82. The signal 84 to the receiver 86 energizes the relay 60 that releases the latch 58 causing the slide 52 to move upwardly (as shown in FIG. 3). This allows the respective springs 41 to urge the respective pins 34 into holes in the wheels 20 or 20*a*. Thus the respective wheels of the casters 18 are prevented from rotating upon movement of the walker 10 into a zone of danger. The zone of danger is typically defined by parent with the apparatus for generating a light beam 74 which cooperates with the reflector 76 disposed at a distance from the transmitter receiver 70. In the event the light beam 74 is broken such as by the passage of the infant or the walker into the zone of danger the transmitter 82 emits a signal 84 to the receiver 86 disposed on the walker 10. The respective Bolen cables 30 extend to the respective four pins 34 that engage the respective four casters 18 upon passing into a zone of danger.

In a typical application, the parent will slide or move the slide 52 back against the spring bias of springs 41 and move the latch or stop 58 against the side of the slide 52 to hold the mechanism in a cocked position. The stop 58 cooperates with a solenoid 60 that is operated by the receiver 86. When the signal 84 is received the stop 58 is moved away from the slide 52 and the slide 52 will move in response to the spring bias imposed by the springs 41 to allow the pins 34 to enter the respective holes of the respective caster wheels 20.

It will be understood that at the moment the stop 58 is released from the slide 52, the caster wheels 20 may not have a hole aligned with each of the respective pins 34. It will be understood by those skilled in the art, however, that if the infant or other user should move the walker ever so slightly there will be a slight rotation of the individual wheel 20 and this will allow the spring bias against the cable 30 to push the pins 34 into their respective hole in the caster wheel.

Because the typical caster wheel is disposed in eccentric relationship to the vertical axis about which the caster can move it will be necessary in some embodiments to provide a tube (not shown) to direct the cable 30 along a path that extends generally vertically along the geometric axis about which the caster rotates and then extends through a an arc that has one end aligned with the vertical axis of the caster 18 and the other end aligned with a radius of the caster wheel 20. Alternatively, if the wheel 20 is less offset, as shown in FIG. 6 the pin 34 will still engage the wheel 20 even though the arc shaped tube is not used.

In the other embodiment of the invention, there is also provided the same receiver 86 and transmitter 70 as described before. The primary difference is in the use of four solenoids 70 at the respective caster wheels 20 that are operated by the receiver 86. Ordinarily, it will be only necessary to energize the solenoids for a short period of time and this is desirable to minimize drain on a battery provided in the apparatus. More specifically, a spring biased latch 92 cooperates with a stop 96 to hold the pin 134 thereof in engagement with the wheel 20*a*.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

What is claimed is:

1. A walker for an infant or incapacitated adult which comprises:

a frame work dimensioned and configured for placement around the user having an upper member dimensioned to enable the user to support him or herself and a lower member encircling the legs of the user, said upper and lower members being disposed in spaced relationship;

a plurality of wheels carried on said second member at spaced parts thereof, said wheels being caster wheels;

means for locking said wheels responsive to passage of said walker into a predetermined zone of danger, said means for locking includes a means contacting the circumference of each of said wheels and a plurality of holes in the circumference of each wheel and a pin dimensioned and configured for engaging said holes.

2. The apparatus as described in claim 1, wherein:

said means for locking includes a cable connected to each pin for limiting axial motion thereof.

3. The apparatus as described in claim 2 wherein:

said means for locking includes a receiver for receiving a signal and a transmitter for sending a signal.

4. The apparatus as described in claim 3, wherein:

said receiver and transmitter utlize a radio frequency signal.

5. The apparatus as described in claim 4 further including:

means for sensing movement of said walker into a predetermined zone of danger.

6. The apparatus as described in claim 5 wherein:

said means for locking includes a solenoid disposed at each caster wheel, each solenoid including a pin for engaging one of said caster wheels.

7. The apparatus as described in claim 6 further including:

means for sensing movement of said walker into a predetermined zone of danger.

* * * * *